April 11, 1967  F. H. McELYA ET AL  3,313,552

BELLEVILLE SPRING AND SEAL RING

Filed Oct. 18, 1963  2 Sheets-Sheet 1

FRED H. McELYA
ALBERT P. FARR
INVENTORS

BY Roy H. Smith, Jr.
ATTORNEY

April 11, 1967  F. H. McELYA ET AL  3,313,552
BELLEVILLE SPRING AND SEAL RING
Filed Oct. 18, 1963  2 Sheets-Sheet 2

FRED H. McELYA
ALBERT P. FARR
INVENTORS

BY
Roy H. Smith, Jr.
ATTORNEY

United States Patent Office 3,313,552
Patented Apr. 11, 1967

3,313,552
BELLEVILLE SPRING AND SEAL RING
Fred H. McElya and Albert P. Farr, Houston, Tex., assignors to Hughes Tool Company, Houston, Tex., a corporation of Delaware
Filed Oct. 18, 1963, Ser. No. 317,276
10 Claims. (Cl. 277—95)

The present invention is an improvement in coned disc springs, also known as Belleville springs, in particular those of such large height-to-thickness ratio as to be easily invertible in the absence of the present invention. Such springs in simplest form have the configuration of a conical shell and are useful because they have an axial resiliency, i.e., a tendency to resist flattening. A typical use is to form a seal between a pair of relatively rotatable members, usually with rubber bonded to the portions of the spring which contact such members. The present invention provides improvements in such simple Belleville springs and in similar Belleville springs of more complicated sections, e.g., multi-conical, and also provides improvements in the applications of these and other forms of Belleville springs.

Belleville springs are typically fabricated from thin sheets of an elastic metal in a single punching operation wherein an annular piece is cut from the sheet by a pair of coaxial circular shears and the ring or washer thus formed is simultaneously shaped by a pair of dies. The spring thus formed is axially compressible (flattenable) and is adapted to be at least partially flattened between a pair of axially spaced surfaces transverse to the spring axis. The members holding the spring must exert a force on the inner and outer edges of the spring to keep it compressed, and the reaction of the spring on such members is utilized to form sealing contacts, hold one member in engagement with another element, etc..

One difficulty with such Belleville springs formed from thin sheets is that they are quite prone to inversion, i.e., they can be turned or flipped "inside out" by pressing the upper edge down or the lower edge up or both until the slope of the ring is reversed. The edge which had been uppermost becomes lowermost, and vice versa. The spring stays in such inverted form until caused to revert to its normal form. While the force required to aright the spring is smaller than the force necessary to invert it, the reverting force may not be readily available in an assembled mechanism, and in the meantime the lubricant may leak out, the engaged elements become disengaged, etc.

The mechanism by which a Belleville spring in a machine assembly is inverted is not always clear, especially when pains are taken to insure that it is properly assembled between a pair of opposed parallel surfaces which are perpendicular to the spring axis. Sometimes inversion is caused by an adjacent surface of a boss in the same assembly which engages an edge of the spring and causes it to be pulled away from the contacted parallel surface. Even in the absence of such engagement, inversion may take place when the parallel surfaces are moved together rapidly. This phenomenon has been observed in laboratory experiments, which also indicated no inversion of the same spring between the same surfaces when the load was applied to it slowly.

Thin Belleville springs can be produced in curved cross sections, but only at considerable expense. This follows because of the high cost of punching dies, particularly those used in forming relatively hard metal such as that involved here. Dies with curved forming surfaces must be made by contour grinding and dressing, and are consequently much more expensive than dies with only flat forming surfaces.

It is therefore a major object of the present invention to provide thin, non-invertible Belleville springs, i.e., springs which will not remain in an inverted configuration when all external forces are released.

Another object is to provide methods of treating thin, invertible Belleville springs to render them non-invertible.

A further object is to provide relatively inexpensive Belleville springs of cross-sectional contours other than conical or multi-conical shells.

A like object is to provide methods of treating thin, invertible Belleville springs of conical or multi-conical shell contour to convert them to desired contours.

Kindred objects are to provide seal rings and seal ring assemblies utilizing such thin, non-invertible Belleville springs, and seal ring assemblies utilizing seal rings made with either such Belleville springs or more conventional Belleville springs.

Briefly, the method and means of achieving such objects by the present invention is by cold working at least a part of the outer surface of the Belleville spring, i.e., the surface facing outwardly with respect to the axis of the spring. This cold working may be accomplished in various ways, as by peening with steel shot, sand blasting, grit blasting or other standard methods of cold working. The minimum extent of such cold working has not been determined for all springs, but the examples below will show that it is not extremely high.

The present invention may become more apparent by a consideration of the illustrations in the attached drawing, in which:

FIGURES 1 and 2 are, respectively, plan and sectional views of a Belleville spring prior to cold working according to the present invention, in its free state, FIGURE 3 is an enlarged axial diametral section through one side of the spring of FIGURES 1 and 2, showing the spring in both its free position and its inverted position, FIGURE 4 is a section like that of FIGURE 2 of the same Belleville spring resulting from the present invention, likewise in its free state, FIGURE 5 shows an application of the same spring as in the prior figures between a pair of relatively rotatable members, FIGURE 6 is a similar to FIGURE 5 in showing an assembly of machine parts including a Belleville spring, but differs therefrom in using a multiple conic spring, in order to avoid interference with a component of the assembly, FIGURE 7 illustrates various extents to which the Belleville spring of FIGURES 1–5 may be cupped in practising the present invention, FIGURE 8 illustrates the same with respect to the multiple conic spring of FIGURE 6, FIGURE 9 illustrates a third embodiment, one which is generally of the opposite configuration of that shown in FIGURES 6 and 8.

Figure 1:
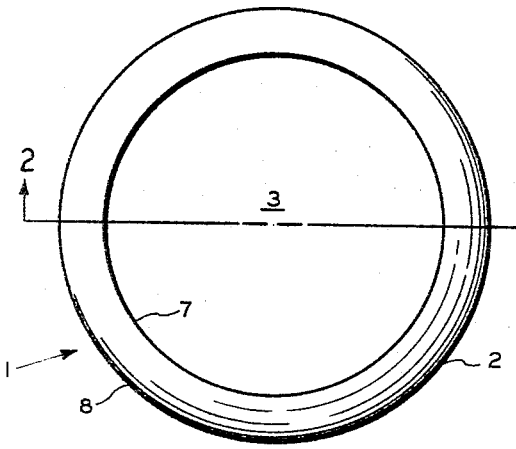
Figure 2:
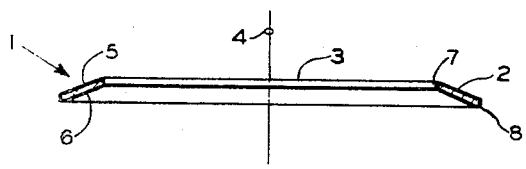

FIGURES 1 and 2 depict a "single angle" or conic Belleville spring 1 prior to the cold working treatment of the present invention, in which the dished, single conic wall 2 defines a central opening 3 having a longitudinal axis 4. In these figures the spring is shown in its free condition.

Figure 3:
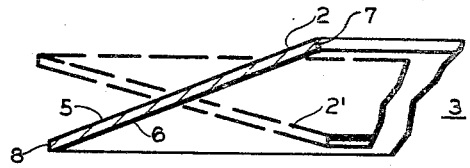

FIGURE 3 shows one side of the same spring as sectioned in a plane passing through the spring axis 4, the numeral 2 indicating the normal position of the wall and 2′ the inverted position. In inverted position the spring is of reduced height as is evident from FIGURE 3.

Figure 4:
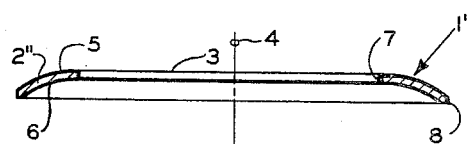

The spring of FIGURES 1–3, after being cold worked according to the present invention, appears as depicted in FIGURE 4. The spring 1′ has been cold worked on outer surface 5, and it is at once apparent that the general effect is to round or cup the spring, forming a rounded wall 2″ from one that was originally flat. The reaction of the thin section is always such as to make the worked surface 5 convex in outline, the unworked surface 6 becoming correspondingly concave. The spring becomes stronger in that a greater axial load must be applied to partially or sompetely flatten it. A much greater bending moment must also be applied to invert the spring, and the surprising result is that the spring reverts to its normal position as soon as such bending moment is removed.

The change thus brought about, making an invertible spring into a non-invertible spring by cold working its outer surface, is not the result of changing the shape from flat to cupped. This has been verified by forming springs having the identical shape as that shown in FIGURE 4 by conventional pressing and forging techniques, and without cold working. Even though the two types of springs were formed from flat sheets having identical dimensions, compositions and histories, and both had the same final dimensions and end shape shown in FIGURE 4, the spring formed only by pressing was invertible while the work-formed spring was not.

Figure 5:
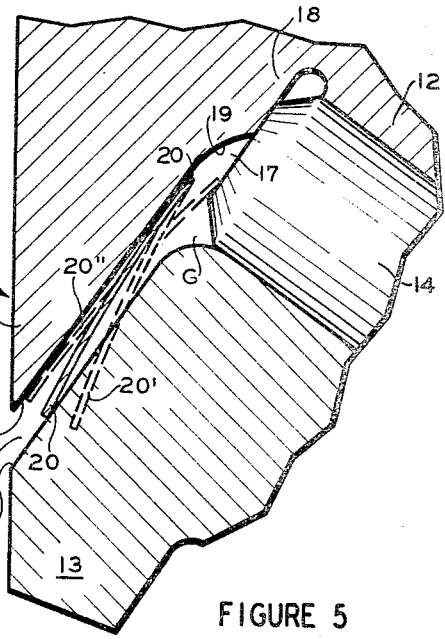

FIGURE 5 typifies an application of the Belleville spring of FIGURE 4 as a lubricant retainer in a conventional rock bit 10. As therein indicated, 11 is a portion of a bit leg, 12 a bearing pin integral with leg 11 and extending downwardly and inwardly therefrom toward the axis of the bit. A rolling cutter 13 is rotatably mounted on pin 12 by bearings which include a set of rollers 14, and the flat base 15 of cone 13 is spaced from the surface 16 of the bit leg by a gap 17. Bit leg 11 also includes a central boss 18 having a rounded peripheral surface 19 smoothly joining surface 16.

Spring 20 is partially flattened in gap 17 as cutter 13 is mounted in the position shown by sliding it into position on pin 12, with rollers 14 in place, the free position of the same spring being indicated by the phantom outline 20′. In FIGURE 5, the symbols M and G represent respectively the mud typically used as a drilling fluid and the heavy lubricant typically packed into the bearings of a rock bit. The chief purposes of the spring 20 in this assembly are to prevent loss of lubricant G and to exclude gritty material in the fluid M from the bearings, both prior to drilling, i.e., handling loss, and during the initial operation period of the bit and it will be apparent that these purposes will be defeated if spring 20 becomes permanently inverted to occupy a position like 20″. An invertible spring will stay in such position until pushed back past a flat configuration, whereas a non-invertible spring will revert to its normal position as soon as the necessary space is available, i.e., there is nothing restraining it in the inverted position. Spring 20 made according to the present invention, for instance, would not stay in position 20″.

Figure 6:
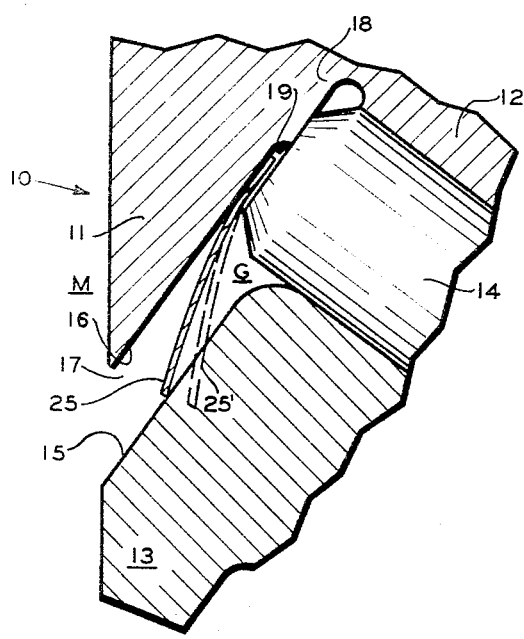

FIGURE 6 shows the same type of assembly used for the same purpose as in the FIGURE 5 illustration, the principal difference being that the dimensions or relative disposition of the elements of the bit require use of a slightly different spring 25, shown also, in phantom, in its free position 25′. This spring has a slight secondary conic near its inner edge to form a "double angle" spring which engages surfaces 15 and 16 at its diagonally opposed edges and will not come into contact with roller 14. It will be noted that a single angle spring extending between the same points would scrape against the chamfered corner of the roller 14.

Figure 7:
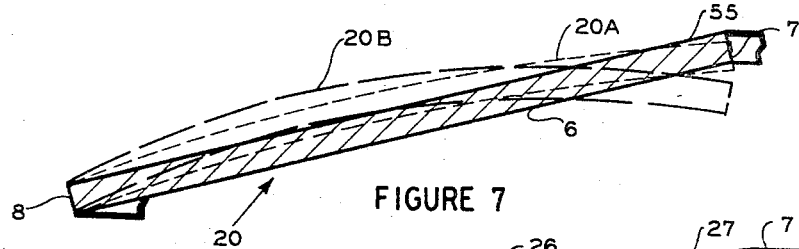
Figure 8:
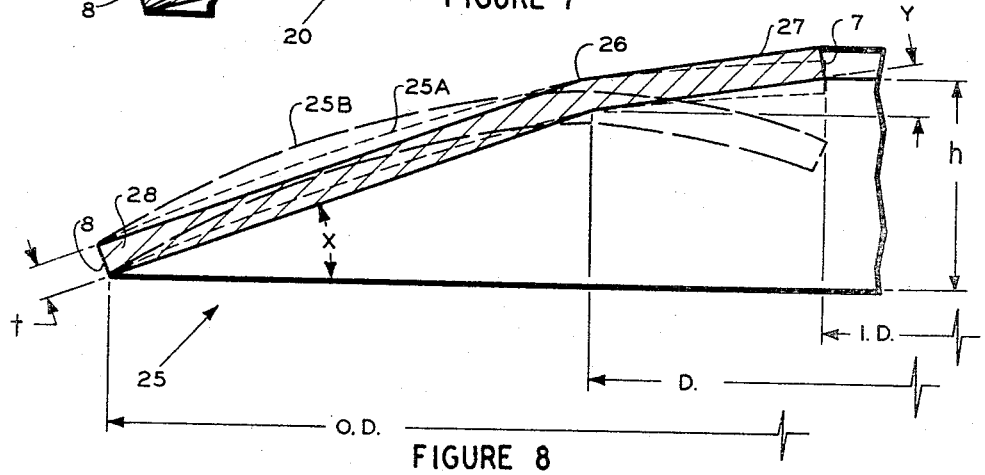

FIGURES 7 and 8 show in exaggerated form the extent to which the single angle spring 20 and double angle spring 25 may be cupped by varying degrees of cold working. The positions indicated by short dash outline at 20<sup>A</sup> and 25<sup>A</sup> result from moderate working, while long dash outlines 20<sup>B</sup> and 25<sup>B</sup> result from severe working. It should be noted that the load required to compress either spring increases with increasing cold work, and that such load may become intolerably high for the application in hand. Also worthy of note is the fact that with severe working the spring is bowed upward to such an extent that the highest point is no longer at one edge, but somewhere in between the two edges 7 and 8. The overall height is reduced slightly, and the inner edge 7 falls increasingly below its initial position. In the double angle spring 25, the intersection 26 of the two legs 27 and 28 tends to become indistinct with increasing intensity of working.

Figure 9:
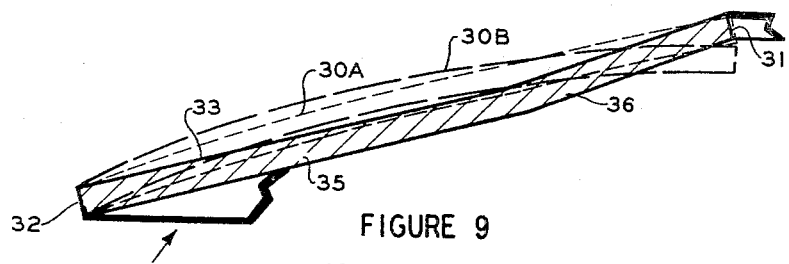

FIGURE 9 illustrates a double conic Belleville spring 30 in which the initially formed member has an inner leg 36 disposed at a larger angle with a normal to the spring axis than the outer leg 35, in contrast with the spring 25 of FIGURE 8. In practicing the present invention, spring 30 is still cold worked on its outer surface 33, moderate working producing a spring of contour 30<sup>A</sup>, shown in short dashes, while severe working modifies the cross section as indicated in 30<sup>B</sup>, shown in long dash outline. It should be noted that there is less tendency for this type spring to have its highest point shifted outwardly from its inner edge 31, even with severe working, and that with moderate working inner edge 31 can easily be kept uppermost. The particular utility of the FIGURE 9 spring lies in applications wherein the extent of flattening of the spring between metal parts of the assembly is such that the inner edge of each of the cold worked springs previously described in connection with other figures would be moved away from the transverse contact surface 16 to be protected, whereas in the FIGURE 9 embodiment the assembled spring has its inner leg 36 essentially parallel to such surface.

Figure 10:
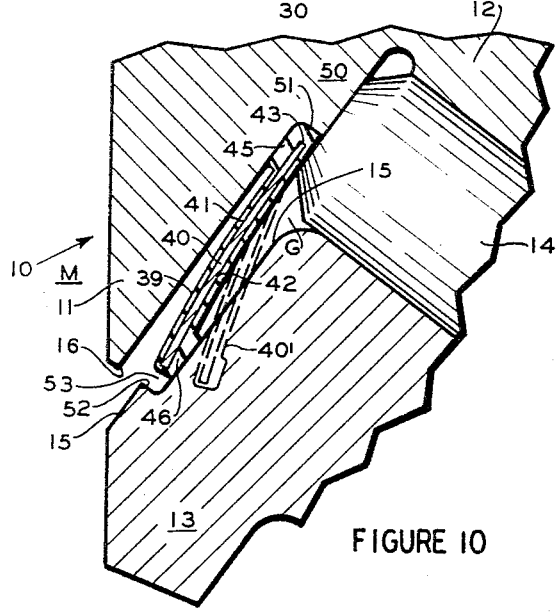
FIGURE 10 illustrates an application of a Belleville spring as a seal ring.

FIGURE 10 illustrates the novel seal ring 39 and novel seal assembly of the present invention. In one preferred embodiment the invention comprises a thin Belleville spring 40 cold worked on its outer surface 41 to increase its load and render it non-invertible, and having a covering of rubber or similar wiping material on at least the contact portions of its inner and outer surfaces 42 and 41 and on edge 43. This seal ring 39 is interferingly fitted at edge 43 to a generally cylindrical surface of one of a pair of relatively rotatable members, surface 51 of boss 50 in the drawing, at its intersection with a transverse surface of the same member, 16 as shown. The rubber covering 45 at the inner edge 43 extends sufficiently inwardly as to require compression when the seal ring is mounted on the boss, and both rubber coverings 45 and 46 on the inner and outer contact surfaces are also compressed when the ring is partially flattened between the opposed surfaces 15 and 16.

Figure 11:
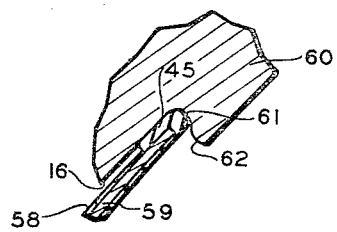
FIGURE 11 illustrates a slightly different application of a Belleville spring as a seal ring.

Another preferred embodiment of the seal assembly of the present invention is indicated in FIGURE 11. This embodiment uses a seal ring 58 having a cross section like that of the seal ring 39, and the assembly is the same as in FIGURE 10 except that boss 60 is provided with a groove 61 adjacent its intersection with sealed surface 16, leaving an annular ridge 62 at the outer end of the boss. Such configuration insures against the tendency for the inner end of the seal ring to move down the periphery of the boss, a condition sometimes unavoidably occurring as a result of the accumulation of cuttings between surface 16 and outer surface of the seal ring, transients pressure differentials, etc.

The Belleville spring 59 of the seal ring 58 may be any of the types previously described, or may be one having any convenient cross section suitable for the particular application. Spring 59 and seal ring 58 may be identical with spring 40 and seal ring 39, but it should be noted that this facet of the invention is not limited to seal rings cold worked as heretofore described. Spring 59 may, for instance be a radially corrugated member, or may be of such large height-to-thickness ratio as to be non-invertible as formed, e.g., those shown in the U.S.

patent recently issued to Atkinson, Cline and Cunningham, No. 3,075,781.

The Belleville springs of the present invention may be cold worked to achieve the desired non-invertibility in a variety of conventional ways, such as rolling, shot peening, sand blasting and grit blasting. In shot peening a blast of small steel shot, e.g., 0.0110–0.0230 inch diameter, is directed to the surface being worked until the desired intensity of cold working is obtained. Peening intensity can be determined by the use of an Almen gage and Almen test strip (see 1955 Handbook of the Society of Automotive Engineers, pp. 207–210, or Metal Progress, vol. 66, No. 1–A, July 15, 1954, an American Society for Metals publication, pp. 104–108), a technique in which the exposed surface of a flat test strip is uniformly shot peened with the same shot as used on the piece being worked and under the same conditions of shot velocity and direction, shot impacts per unit area, etc., and the arc height of the resulting curved strip is measured. When the peening intensity for a given spring has been determined, it may be specified in terms of Almen intensity, which is nothing more than the arc height of such a test strip.

Another manner of specifying peening intensity is in terms of the force required to compress a peened Belleville spring to a fixed height. This method has been employed in practicing the present invention on a spring of the type shown in FIGURE 8. As an example, springs were formed of full hard, cold rolled and tempered 301 stainless steel with a thickness "$t$" of 0.12", an outside diameter "O.D." of 3.125", an inside diameter "I.D." of 2.578" and a height "$h$" of 0.065", all such dimensions being prior to peening. The diameter "D" of the spring at the angle change was 2.760", angle "X" was 17°, and angle "Y" was 5°40'. As thus formed, the springs were invertible.

This spring, with others identical to it, was then secured to a rotary work table which rotated it under a blast of shot from an impeller. The shot in the blast was of high carbon steel having a Rockwell "C" hardness of 45–50, about half being of 0.016 inch diameter and half of 0.011 inch diameter. This shot struck the spring surface approximately normally at a velocity of about 200 feet per second. Such peening was continued while the spring was rotated under the blast until approximately one million shot impacts were made over the complete surface. As the area peened was 2.53 inch$^2$, this may be expressed as $0.395 \times 10^6$ or roughly 400,000 impacts per square inch.

This spring was non-invertible and also satisfied certain specifications based largely on the dimensions of the space in which it was to be used and on the desired load-deflection characteristic. It was compressible to a height of 0.035" with an axial load of 50 pounds or more and the load required to compress it to a height of 0.045" did not exceed 65 pounds.

Under the same conditions, an identical spring became non-invertible after receiving only ½ million impacts over the complete surface, this being about the minimum safe peening to prevent invertibility. In addition, identical seals were made non-invertible by peening only a fraction of the outer surface. In one of these, the complete outer leg 28 (FIGURE 8) was uniformly peened at the same 400,000 impacts/inch$^2$ intensity, while in another only an annular band ⅛ inch wide of such outer leg, adjacent the outer edge, was peened at such intensity. In yet a third, the outer leg 28 was completely but non-uniformly peened, starting at 400,000 impacts/inch$^2$ at the outer end and decreasing to a lesser intensity at the intersection with the inner leg. All of those specimens, of course, were thus cold worked at the shot velocity, shot size, etc., mentioned above.

It goes without saying that there is no maximum peening intensity for non-invertibility, and that such maximum will be determined by other desired spring characteristics, e.g., load-deflection characteristic, final contour, etc.

The specific data given above is not general applicability, as peening intensities to achieve non-invertibility will vary with composition, prior metallurgical history, thickness, height-to-thickness ratio, etc. For any given material and set of dimensions, a certain amount of experimental work must be done to determine maximum peening intensity to make the spring non-invertible and the range of intensities which will give the desired final dimensions and load-deflection characteristic.

It will be noted that the cold working thus far described has been always on the outer surface of the springs, i.e., the surface facing up and outwardly from the spring axis (or down and outwardly in other applications). To ascertain the full effect of their discovery, the present inventors also applied the cold working treatment to the inner surface of some springs, and in yet others to both the inner and outer surfaces. Those springs which were shot peened on only the inner surface were rendered more readily invertible than before peening. Surprisingly, however, those springs which were peened on both surfaces were thereby rendered non-invertible. The range of relative intensities has not been determined, but such springs are non-invertible when the peening intensities are the same, and regardless of which surface is peened first.

While it has long been known that cold working of the type employed in the present invention improves the fatigue strength of steel parts, it is believed to be new and surprising that the same treatment may be used to shape thin metal pieces, to make them non-invertible or both. The present inventors tried many expedients to overcome the invertibility of thin Belleville springs— varying composition, heat treatment, shape, etc., but were unable to solve the problem until developing the cold working methods of the present invention.

It is noted that in the drawing all springs and seal rings are shown with the outer surface facing upwardly, and it requires only passing mention that such outer surface may have a downwardly facing orientation, which of course will vary with the assembly in which it is used. Similarly, all seal rings are shown with one of the rubber coverings extending over the inner edge and the adjacent portion of the outer surface, but it is believed to be apparent that such rubber may be used on the outer edge, or may be omitted altogether, again depending on the assembly. Since the outer surface of the springs described in connection with the drawing is by definition that which in free position of the spring faces outwardly—as well as either upwardly or downwardly—in the compression type assemblies illustrated the rubber covering on the outer surface must be placed on the part adjacent the inner edge, and similarly the rubber on the inner surface must be adjacent the outer edge. When the seal ring is to be used in a "free floating" manner, i.e., without an interference fit to any boss or other member having a cylindrical surface, it is not essential to have rubber on either edge, and the same is true when an edge of the spring itself is to be interferingly fitted to a boss. When such an interference fit is used, it may be to either a boss at the inner edge of the seal ring, as shown in FIGURE 10, or to a cylindrical surface such as 52 in the recess of cone 13, and the rubber covering must extend over the appropriate edge (except for the metal-to-metal interference fit mentioned). Whichever assembly is used, it is important to provide a gap 53 between the edge opposite the interfering edge and any nearby cylindrical surface to prevent buckling of the seal ring.

It may also be noted that the surfaces of the springs discussed herein need not always be parallel to each other, and that the present invention is generally applicable to any spring in which the outer surface is partially plain, i.e., conical. Also, in the seal assemblies, the surfaces sealed need not be parallel to each other, and one or both may be somewhat slanted from strictly normal to the spring axis, as in FIGURE 10, so long as each is a surface of revolution. As used in the appended claims, the expression "a pair of generally radially extending surfaces" and the like are intended to imply such latitude of expression.

What is claimed is:

1. A Belleville spring originally being invertible and having an axis and at least one rounded conical section of large height-to-thickness ratio, said conic section having an outer surface facing upwardly and outwardly from said axis and an inner surface facing downwardly and inwardly toward said axis, said spring being cold worked on at least a part of said outer surface to render said spring non-invertible and to make said outer surface convex and said inner surface concave.

2. A non-invertible Belleville spring of large height-to-thickness ratio and having a rounded conic section with a convex outer surface and a concave inner surface, said Belleville spring having originally been invertible and having been rendered non-invertible by cold working at least a part of said outer surface.

3. The non-invertible Belleville spring of claim 2 in which said cold working of the outer surface is a shot peening.

4. The non-invertible rounded Belleville spring of claim 2 in which both said outer surface and said inner surface are cold worked by shot peening, the intensity of peening of the outer surface being at least equal to the intensity of peening of the inner surface.

5. In an originally invertible Belleville spring symmetric about an axis and having a conical cross section with an outer surface and an inner surface, and also having inner and outer edges, said outer surface facing up and outwardly from said axis and said inner surface facing down and inwardly toward said axis, the improvement comprising said Belleville spring being non-invertible and said conical section thereof having a cupped shape with a convex outer surface and a concave inner surface, said shape and change in invertibility resulting from cold working said outer surface.

6. A seal ring comprising the improved Belleville spring of claim 5 with a rubber covering bonded to at least the portion of its outer surface adjacent its inner edge and the portion of its inner surface adjacent its outer edge.

7. The seal ring of claim 6 in which said rubber covering extends over one of the edges of the spring.

8. A seal assembly comprising a pair of relatively rotatable members each of which has a generally radially extending annular surface opposed to the like surface of the other member and spaced therefrom to define an annular gap, and the seal ring of claim 6 disposed in said gap and partially flattened between said opposed surfaces and making sealing contact therewith.

9. A seal assembly comprising a pair of relatively rotatable members each of which has a generally radially extending annular surface opposed to the like surface of the other member and spaced therefrom to define an annular gap, one of said members including a portion extending generally axially and presenting a generally cylindrical surface at one end of said gap, and the seal ring of claim 7 disposed in said gap and partially flattened between said opposed surfaces and making sealing contact therewith, said rubber covering also making sealing contact with said generally cylindrical surface.

10. A seal ring assembly comprising a pair of relatively rotatable members disposed to define an annular gap between a pair of opposed, generally radially extending annular metal surfaces, one on each said member, one of said members also having a surface generally transverse its radial surface and concentric therewith, such transverse surface having an annular groove adjacent its intersection with its radially extending surface to leave an annular ridge, and a seal ring comprising the Belleville spring of claim 5 having a first rubber covering extending over said inner edge and the adjacent portion of said outer surface and a second rubber covering extending over the portion of said inner surface adjacent said outer edge, said first rubber portion sealingly contacting one of said metal surfaces and the wall defining said groove and the second contacting said other metal surface.

References Cited by the Examiner

UNITED STATES PATENTS

| | | | |
|---|---|---|---|
| 2,234,850 | 3/1941 | Wallace | 267—47 |
| 2,341,674 | 2/1944 | Wallace | 72—53 |
| 3,002,865 | 10/1961 | Johnson | 148—12 |
| 3,029,071 | 4/1962 | Wells | 267—1 |
| 3,073,022 | 1/1963 | Bush et al. | 72—53 |
| 3,075,781 | 1/1963 | Atkinson et al. | 277—83 |
| 3,096,835 | 6/1963 | Neilson | 277—95 X |
| 3,114,560 | 12/1963 | Dunn | 277—94 |
| 3,137,508 | 6/1964 | Cunningham | 277—95 |

LAVERNE D. GEIGER, *Primary Examiner.*

J. MEDNICK, *Assistant Examiner.*